Feb. 6, 1940.  E. L. THOMPSON  2,189,088
FLUID PRESSURE MOTOR
Filed Nov. 29, 1935  4 Sheets-Sheet 1
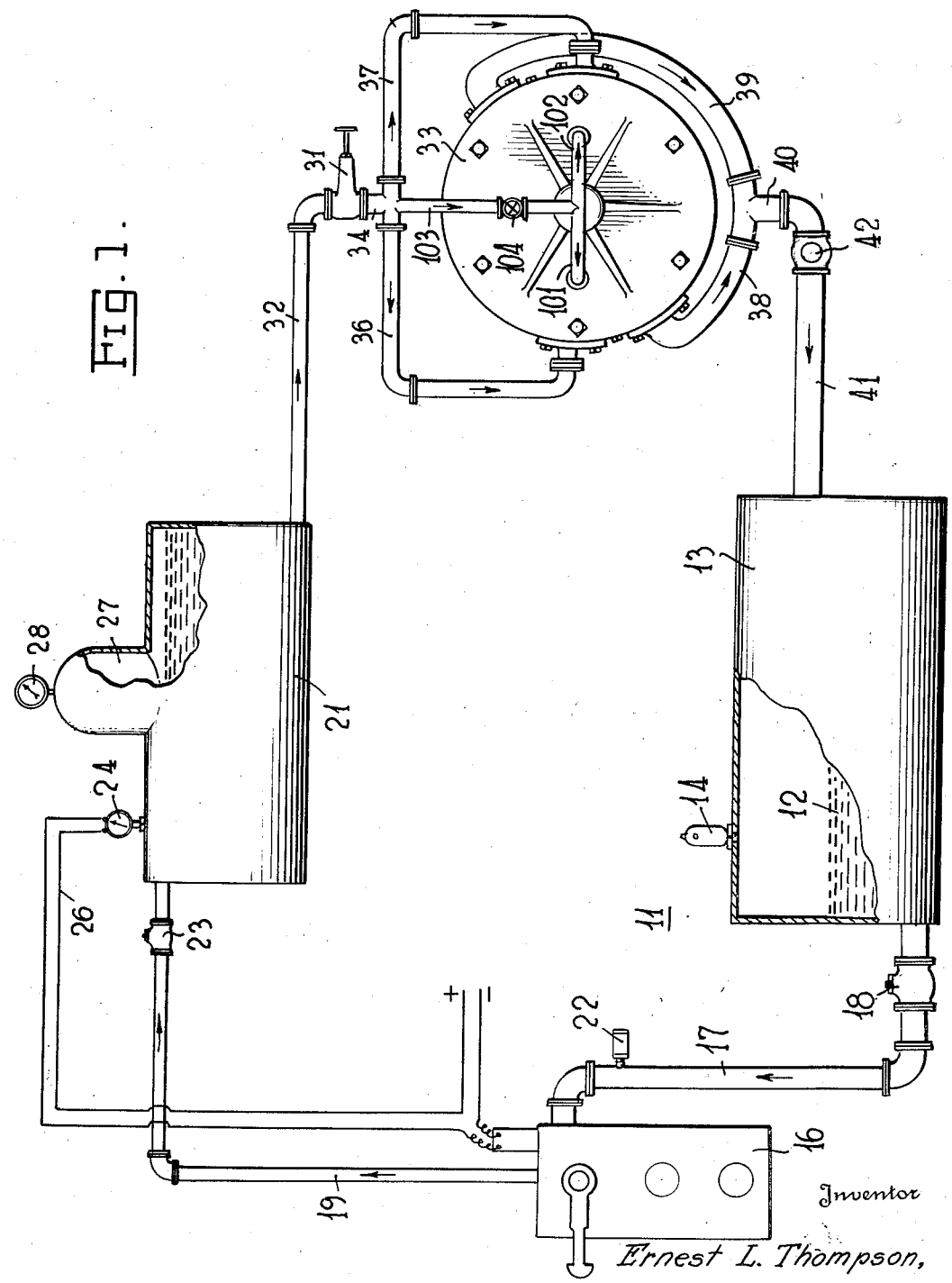

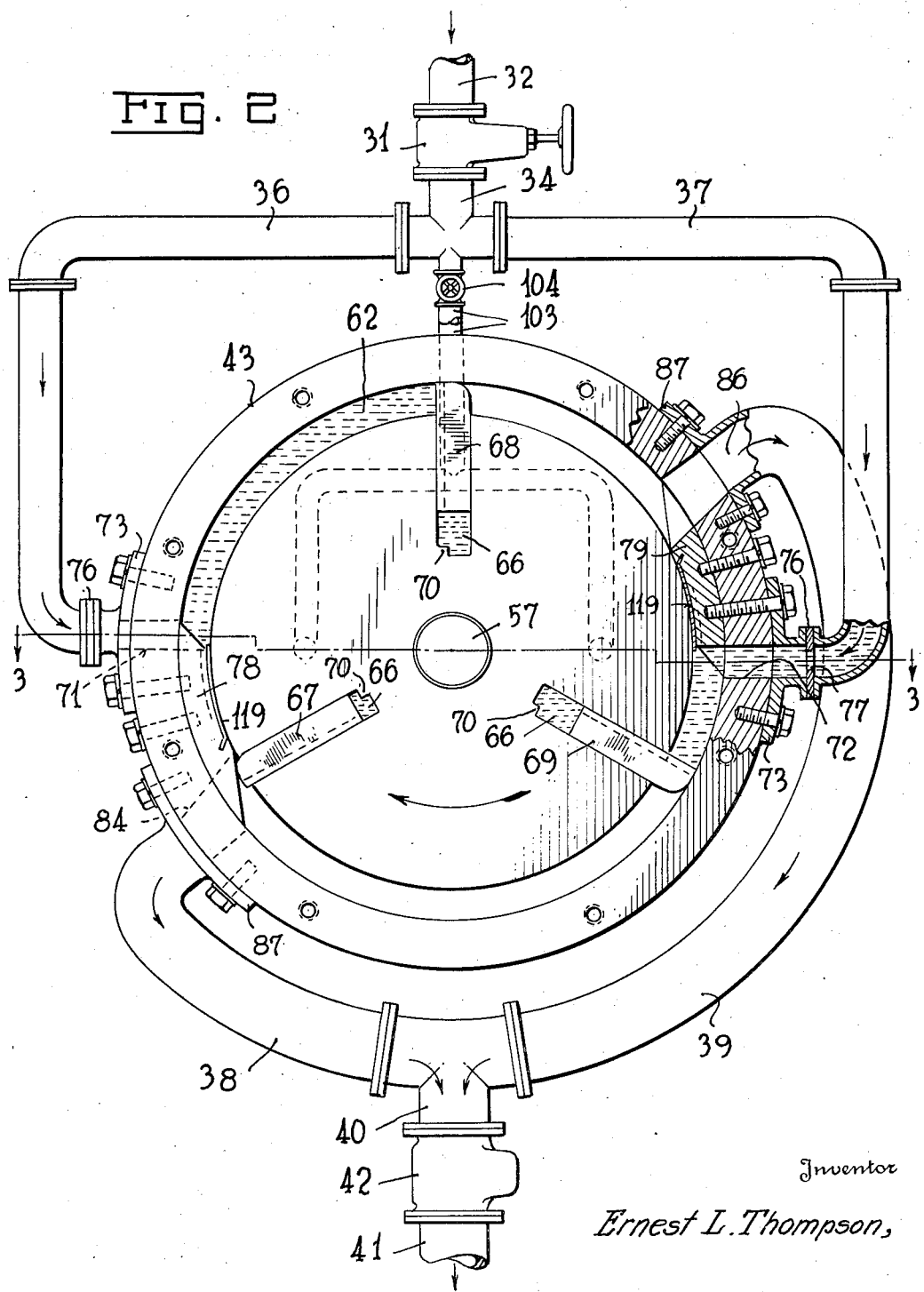

Feb. 6, 1940.     E. L. THOMPSON     2,189,088
FLUID PRESSURE MOTOR
Filed Nov. 29, 1935     4 Sheets-Sheet 3
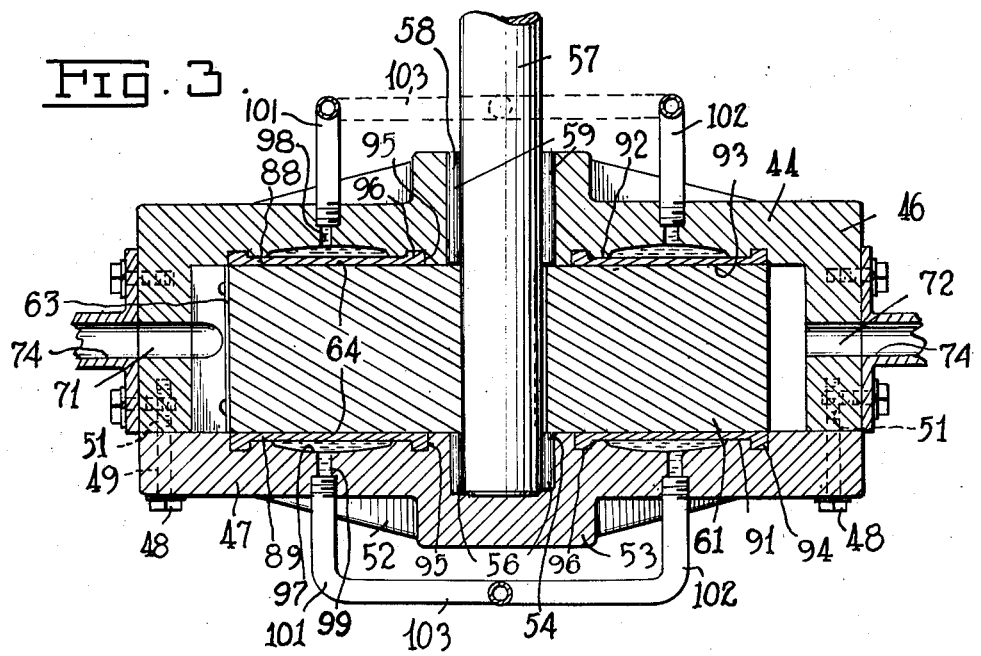
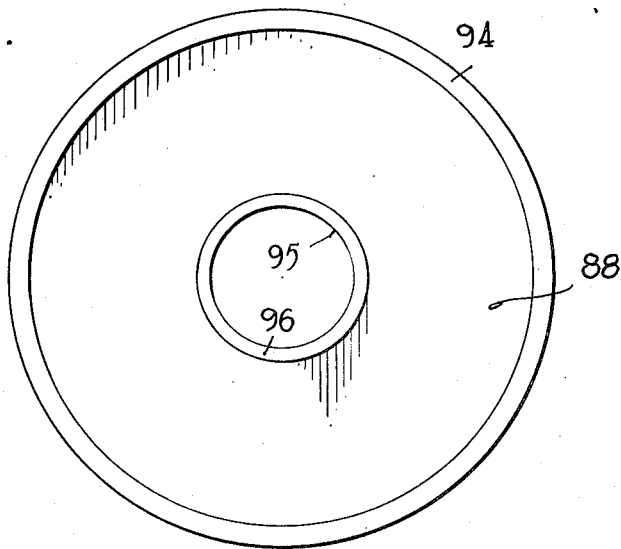
Inventor
Ernest L. Thompson,
By Archibald R. McCollum
Attorney Feb. 6, 1940. E. L. THOMPSON 2,189,088
FLUID PRESSURE MOTOR
Filed Nov. 29, 1935 4 Sheets-Sheet 4

Inventor
Ernest L. Thompson,

By Archibald R. McCallum
Attorney

Patented Feb. 6, 1940

2,189,088

UNITED STATES PATENT OFFICE 2,189,088

FLUID PRESSURE MOTOR

Ernest L. Thompson, Washington, D. C.

Application November 29, 1935, Serial No. 52,271

2 Claims. (Cl. 121—92)

My invention relates to power transmission mechanisms and more particularly to mechanisms for translating pulsating power to steady power.

Considerable development work has been carried on in recent years directed toward the designing of fluid transmissions which will be infinitely variable as to speed without set ratio changing steps. These developments have ordinarily taken the form of designing a rotor operable within a casing and having an area between the rotor and the casing constituting a chamber for the fluid, in which chamber is adapted to revolve spaced buckets or vanes carried by the rotor. The casing is provided with spaced inlet and exhaust ports usually defined by abutments involving the radial movement of the vanes or blades in spaced radial recesses in the rotor. Motive fluid is supplied to the rotor chamber under relatively high pressures and the art heretofore has taught the extreme difficulty encountered in constructing a hydraulic power transmission which will be leak-proof while at the same time designed sufficiently to eliminate friction as to be efficient.

It is an object of the present invention to provide a mechanism for transmitting power hydraulically which will be designed to accommodate extremely high fluid pressures.

Another object of the invention is to provide a device of this class in which a hydraulic pressure generator drives a hydraulically operated motor.

It is another object of the invention to provide in a hydraulic power transmission a single valve connected between the generator and the motor for controlling the operation of the motor.

It is another object of the invention to provide a rotor construction which will be leak-proof against extreme pressures and yet durable and efficient in operation.

A further object of the invention is to provide a power transmission capable of infinite variation as to speed without jar, vibration, or the like.

A further object of the invention is to provide a power transmission mechanism of the hydraulic rotor type in which friction is reduced to a minimum.

A further object of the invention is to provide a mechanism of the class described which is simple of construction, efficient in action, and which will not readily deteriorate or get out of order.

The invention will be more clearly understood by reference to the following detailed description read in connection with the accompanying drawings forming part thereof, in which, Figure 1 is a diagrammatic view showing the system including the variable speed transmission;

Figure 2 is an enlarged vertical sectional view of the rotor shown in Figure 1;

Figure 3 is a section taken on the line 3—3 of Figure 2;

Figure 4 is an elevation of one of the floating pressure plates shown in Figure 3;

Figure 5:
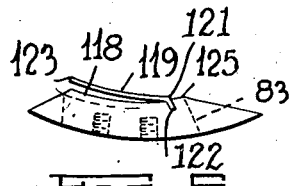
Figure 5 is a detailed view in elevation showing the construction of a typical abutment.

Referring to the drawings wherein similar parts in the several views are designated by identical reference numerals according to one embodiment of the invention, there is provided a system 11 for the operation of the conventional type of Escalator, not shown.

The system as shown in Figure 1 is actuated through the employment of pressure of any desired liquid 12, such as a non-vaporizing oil, and a reservoir or dump tank 13 stores a sufficient quantity of liquid to maintain the system in operation. The tank 13 has a valve 14 for maintaining the pressure in the dump tank at not more than atmospheric. A pump 16 of the ordinary type is connected to the dump tank 13 by a pipe 17 including a check valve 18 adapted to be opened only by suction of the pump 16. The pump 16 is normally operated to pump the liquid through a supply pipe 19 into a pressure reservoir chamber 21; however, the pipe 17 is fitted with an adjustable air inlet valve 22 located above the maximum level of the liquid 12 in the dump tank 13 for admitting air to be pumped into the pressure reservoir chamber 21 to build up a compressed air column therein. The supply line 19 is provided with a check valve 23 for preventing back pressure from the chamber 21.

The pressure reservoir chamber 21 has a liquid level gauge 24 connected preferably with an electric cut-off for automatically stopping the compressor 16 upon the liquid attaining the maximum level in the chamber 21. The purpose of the pressure reservoir chamber 21 is to provide for the application and maintenance of a steady head of pressure on the liquid 12 therein. Accordingly, an air dome 27 thereon communicates with the interior of the chamber 21 and is equipped with a gauge 28 which registers the pressure in the chamber. It will be understood that air supplied through the valve 22 may be pumped by the compressor 16 into the chamber 21 and collected with accumulative force in the air dome 27 to constitute a resilient cushion for the liquid and provide a constant pressure on the transmission supply.

A power control valve 31 provided in a pipe 32 communicating with the bottom of the pressure reservoir chamber 21, directly determines the flow of liquid under pressure from the reservoir 21 to drive a hydraulically actuated rotor 33.

A motor 33 is supplied from the control valve 31 through a cross 34 connecting branching inlet lines 36 and 37. After passing through the motor 33, the construction and operation of which will be described hereinafter, the liquid is exhausted through dump lines 38 and 39 which converge at a cross 40 connecting therewith a pipe 41 communicating with the dump tank 13. As presented, the liquid is exhausted from the rotor against atmospheric pressure in the dump tank 13; however, it is obvious that the speed of the rotor may be increased materially if desired by maintaining a vacuum in the dump tank 13 by any suitable exhaust pump, not shown. An automatic valve 42 in the line 41 is normally closed to shut the exhaust when the valve 31 is closed, in order to permit pressure to build up in the casing when the valve 31 is first opened. It is adapted to open as soon as sufficient pressure builds up to turn the rotor.

The construction and operation of the motor 33 is shown generally in Figures 2 and 3. The motor includes a stationary cylindrical casing 43 consisting of a circular end plate 44 with a perpendicular flange 46 constituting the circular wall of the casing. An opposite circular end plate 47 is adapted to be rigidly connected therewith by bolts 48, 48 in holes 49 spaced about the rim of the plate 47 and engaged in corresponding recesses 51 in the casing wall 46. It will be observed that the abutting faces of the casing wall 46 and the end plate 47 respectively, are machined true to insure a perfect seal therebetween when the casing is assembled. Viewed in cross-section, see Figure 3, the inner surfaces of the end plates 44 and 47 are finished with precision to insure their absolute smoothness, and the angles between the circular wall 46 of the casing and the end plates thereof are finished to true right angles throughout their entire extent. In order to enable the rotor casing 43 to withstand without deformation the large pressures exerted thereon in operation, the end plates 44 and 47 are formed exteriorly with integral spider ribs 52 extending radially from axial bosses 53.

The end plate 47 is provided on the inner surface with an axial recess 54 for accommodating roller bearings 56 supporting the end of a driven shaft 57. The other end of the driven shaft 57 may be supported and connected in any suitable manner for driving the main sprocket of an escalator or any other mechanism, not shown, to which power is intended to be transmitted. The end plate 44 has an axial recess 58 aligned with the recess 54 for accommodating roller bearings 59 also supporting the driven shaft 57. Keyed on the shaft 57 for rotation in the casing 43 is a wheel or rotor 61.

The wheel 61, which it will be understood, constitutes the rotor of the motor, is cylindrical and of smaller diameter than the interior of the casing 43 for providing an annular chamber 62 at its periphery 63 for accommodating the motive liquid. The periphery 63 of the wheel is machined smooth as to be perfectly concentric with the shaft 57 and the inner surface of the casing wall 46, while its parallel sides 64, 64 are finished smooth and perpendicular to the shaft 57. The width of the wheel 61 is but slightly less than the distance between the end plates 44 and 47 to permit ready rotation therebetween.

At spaced points in the periphery of the wheel 61, radial recesses 66, 66 are formed, extending entirely across the width of the wheel to constitute ways for buckets or blades 67, 68 and 69. The recesses 66, as shown particularly in Figure 2, are exactly rectangular in cross-section, and the blades 67, 68 and 69 are of corresponding thickness to enable their nice fit while permitting rigidly defined sliding movement therein radially of the rotor. The detailed construction of the blades 67, 68 and 69 constitutes an important aspect of the invention and will be discussed in detail below. An offset 70 is formed in the bottom of each recess 66 to space the radial blade therefrom, in order to facilitate the building up of pressure against the bottom of the blades.

At diametrically opposite points the rotor casing 43 is formed with radial apertures 71, 72 constituting inlet means for the motive liquid. The branch inlet lines 36 and 37 are connected respectively to the inlet apertures 71 and 72 by coupling plates 73 bolted to the periphery of the casing. The coupling plates have an axial recess 74 aligned with the inlet apertures for admitting the liquid, and are connected to the branch inlet lines 36 and 37 by jets or plates 76. The jets 76 are formed with metering orifices or axial apertures 77 in line with the inlet apertures and coupling plate recesses 74. It will be noted that the jets 76 are removable for the purpose of replacement with jets having apertures of varying diameters in order to permit controlled variation of the volume of the liquid passing therethrough. As represented in the drawings, see Figure 2, the rotor illustrated is designed to have a clockwise rotation. Adjacent to the inlet apertures 71 and 72, abutments 78 and 79 respectively, are attached. The abutments 78 and 79, which will be described in detail hereinafter, are rigidly bolted to the inner face of the circular wall 46 of the casing at the inlet apertures, the abutment being provided with an arcuate recess 81 in axial alignment with the inlet apertures 71 and 72. The abutments 78 and 79 are positioned in the casing to extend in a counterclockwise direction from the inlet apertures, and at the opposite end from the arcuate recess 81 are each formed with an inclined cam surface 82. The abutment at the cam portion 82 is bifurcated to afford a passageway 83 for exhausting the motive fluid through diametrically opposed exhaust vents 84 and 86 cut radially through the casing 43. The dump lines 38 and 39 are flanged at 87 and rigidly bolted to the exhaust vents 84 and 86, respectively.

The conventional operation of the above type of rotor is broadly carried out. In the present instance, the motive fluid entering under pressure through the valve 31, which may be manually adjusted to determine the volume passing therethrough. The liquid passes under pressure through the T 34, the inlet lines 36 and 37, and the inlet apertures 71 and 72, respectively, to fill the annular chamber 62. When the fluid fills the aperture or the annular chamber 62, its pressure becomes effective upon the rear face of the adjacent blades 67, 68 and 69 and urges them away from the inlet apertures in a clockwise direction. Considering for the moment Figure 2, it will be observed that the motive liquid entering an inlet aperture 72 collects in the annular chamber 62 between the abutment 79 and the rotor blade 69. The pressure builds up therein and urges the blade, which is held against the inner surface of the rotor casing in a manner to be explained below, toward the exhaust vent 84. The rotation of the rotor carries the blade upon the cam surface 82 of the abutment 78, depressing it into its recess 66 and permitting the liquid to escape through the exhaust vent. Prior to the time at which the fluid exhausts from behind blade 69, blade 68 will have been carried in position to receive the liquid under pressure from the inlet aperture 72, such pressure being adequate to carry the blade 69 beyond the abutment 78 whereupon it receives liquid under pressure from the inlet aperture 71 for further actuation toward the exhaust vent 86. The disposition of the inlet apertures and exhaust vents described above with respect to the radial blades of the rotor is such as to insure that at all times in the operation of the rotor, two of the vanes are being driven while one thereof is being exhausted, thus insuring the maintenance of a head thereon at all times.

Important concepts of the invention are the detailed construction of the abutments 78 and 79, the rotor blades 67, 68 and 69, and floating pressure plates 88 and 89 disposed in the side walls of the rotor casing concentric with the shaft. For continuity in description the latter will be discussed in detail first.

During recent years the developments which have taken place in the designing of hydraulic power transmission, have emphasized the difficulty of constructing efficient rotors in which safeguards against leaking under essential high pressures have been counterbalanced from the efficiency standpoint by the extremely high frictions developed. The problem is satisfactorily solved by the construction shown in Figures 3 and 4. The side walls 44 and 47 are at their inner face annularly recessed at 91 and 92. The recesses 91 and 92 are concentric with the casing, and the shaft 57, to accommodate bearing or pressure plates 88 and 89, respectively. The pressure plates and the recesses are identical, the former comprising a disc-like construction having a plane surface 93 and the opposite face thereof formed with a peripheral ridge 94 and an axial aperture 95 of measurably greater diameter than the shaft 57, the axial aperture being defined by a ridge 96 which may be of the same depth as the peripheral ridge 94. The annular recess 91 is formed to receive the pressure plate so that the plane surface 93 thereof is flush with the face of the side wall. The surfaces of the pressure plates are machined smooth and the corresponding surface of the side wall at the annular recess is correspondingly machined to permit smooth rotation therein of the pressure plate.

On the above construction it will be observed that rotation of the wheel 61 will be between the pressure plates 88 and 89 which will be permitted a drift in a rotary direction in the annular recesses 91 and 92. Midway between the peripheral and axial ridges 94 and 96, the side plates are formed with an annular recess 97 of arcuate cross-section with which communicate passageways 98 and 99 disposed at diametrically opposite points perpendicularly through the side walls 44 and 47. Branch lines 101 and 102 on each side of the casing connect by means of a line 103 at the cross 40 for admitting fluid under the system pressure into the arcuate annular recesses 97, whereby it will be observed that the pressure plates are held against the wheel 61 with the same pressure existing in the annular chamber 62 preventing any differential in pressure and a consequent tendency to leakage beyond the wheel. Each pressure plate supply line 103 is provided with a control valve 104 in order to permit, when desired, limiting the pressure against the arcuate plates to less than that obtaining in the annular chamber. The above arrangement insures that the pressure plates function as floating bearings for the rotor wheel 61, and since the greater portion of the area of the pressure plate abuts the arcuate pressure recess 97, friction is maintained at a minimum. The ridges 94 and 96 function to seal the arcuate pressure recess 97 against leakage or communication with the annular chamber 62.

The construction of the vanes or blades 67, 68 and 69 is clearly shown in Figures 7 to 10 inclusive. The construction illustrated is designed primarily to compensate for wear which normally takes place upon the outer edge 106 as a consequence of its travel along the inner surface of the casing wall 46. Heretofore rotor blades have been urged upon the casing wall by means of springs mounted in the bottom of the blade guideway, or they have been urged outwardly by pressure of fluid led into the bottom of the guideway through passageways connecting the guideway with a fluid passageway bored through the shaft. In such arrangements, however, there has been deterioration due to wearing out of the springs and weakening of the structure due to the communicating fluid passages. It is here proposed to eliminate such defects by getting fluid under pressure to the bottom of the blade guideway from the annular chamber 62. The blade consists of interfitting parts 107 and 108, the part 107 constituting the main portion thereof and consisting of a web 109 extending the full width of the blade, one side 111 of which is a full thickness. The other side 112 of the web is of reduced thickness and provided at the upper or peripheral portion of the blade with a recess 113. The part 108 has a face portion 114 and a rectangular protuberance or lug 116. The parts are assembled with the face portion resting on the reduced side portion 112 and the lug 116 fitting in the recess 113. When assembled in the guideway, as shown particularly in Figures 7 and 8, it will be observed that the adjacent edges of the thicker side 11 and the face portion 114 are parallel and correspond throughout their entire extent, but are spaced to provide a vent 117, the engagement of the lug 116 in the recess 113 preventing the face portion being brought closer to the side 111. In such relation, the parts form a blade which is rectangular in elevation adapted to fit snugly in the radial blade-ways of the rotor and abut flush with the pressure plates 88 and 89. In operation, when the blade passes one of the inlet apertures 71 or 72, the liquid under pressure accumulates in the annular chamber 62, flows along the vent 117 to the bottom of the radial guideway 66 where it builds up a pressure against the lower edges of the blade parts 107 and 108, it being noted that said lower edges are plane and perpendicular thereto. The pressure of the fluid in the bottom of the recess 66 is constant and equal to the pressure in the system. During operation of the rotor at all stages regardless of the position of the blade in the guide-way, the fluid fills the vent 117, thereby urging the parts 111 laterally toward the side wall 44 and the part 108 in the opposite direction toward the side wall 47, thus insuring an ever-present resilient force which will maintain the blade in close contact with the opposite pressure plates thus compensating for wear and preventing the development of leaks which would ordinarily result therein. The arrangement is equally effective for compensating for wear upon the peripheral edge of the blade, since the pressure accumulative at the bottom of the guide-way 66 is always effective to maintain the blade toward the inner surface of the motor casing 43. Inasmuch as the gap between the blade parts forming the vent 117 is on the rearward or pressure-receiving surface of the blade, there is no possibility of the liquid leaking between the parts inasmuch as the equivalent pressure is effective upon the surface 114 to maintain the part 108 snugly upon the portion 112, and such leakages are further inhibited by the snug fit of the blade in the guideway 66. The projection of the lug 116 into the recess 113 insures that the part 108 will be carried radially by pressure effective along the lower face of both parts.

From the foregoing it will be observed that the blade construction described provides for compensation of wear on the plate or all the surfaces on which wear is most likely to occur.

Figure 6:
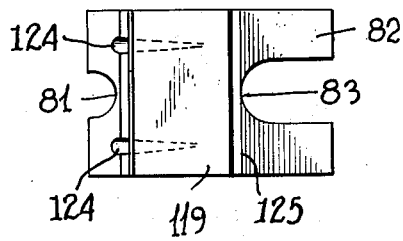
Figure 6 is a plan view of the abutment shown in Figure 5.
Figure 7:
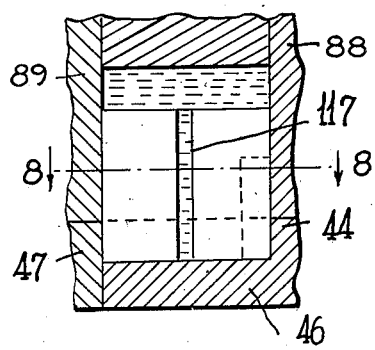
Figure 7 is a fragmentary view showing one of the buckets or blades mounted in the rotor and in driving engagement with the casing lining.
Figure 8:
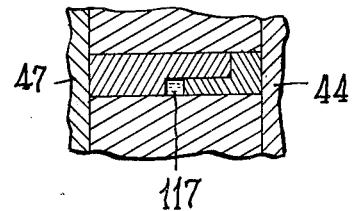
Figure 8 is a section taken on the line 8—8 of Figure 7.
Figure 10:
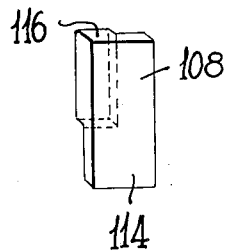
Figure 10 is a corresponding perspective view of the smaller section of the same blade.
Figure 9:
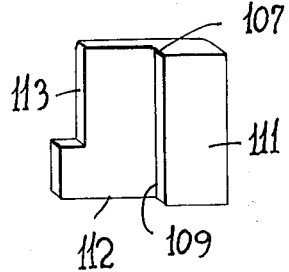
Figure 9 is a perspective view of the larger section of the composite blade.

Figures 5 and 6 illustrate in detail the construction of the abutments 78 and 79. As will be observed by referring to Figure 2, the abutment comprises a metal block arcuately curved concentrically with and adapted to lie along the inner surface of the casing. The thickness of the abutment corresponds with the clearance between the wheel 61 and the inner surface of the casing, or in other words, corresponds exactly to the width of the annular chamber 62. Therefore, a forward face 118 bears on the periphery of the wheel 61 so that fluid behind the abutment will be diverted into the exhaust vent, the abutment extending entirely across from side wall 44 to side wall 47 to divide the annular chamber into two equal and non-communicating portions. As a further wear compensating feature, the face 118 of the abutment is countersunk and fitted with a resilient sealing leaf 119, one end 121 of which is fast in a groove 122 cut in the face of the abutment. The opposite end 123 of the leaf is free to swing from the abutment but is held thereupon by the wheel 61 in order to insure smoothness of operation and prevent the development of back pressure. The end 123 of the leaf extends to the plane of the inlet aperture in order to seal the blade from effect thereby until the forward face of the blade is in the plane of the inner aperture. The action of the leaf seal 119 is controlled by system pressure by reason of parallel grooves 124, 124 cut in the face thereof, underlying the leaf-seal and communicating with the inlet aperture, see Fig. 6, whereby it will be apparent that the fluid under pressure will be effective upon the inner face of the leaf to urge it upon the blade. By reference particularly to Figure 6, it will be observed that the passageway 83 cut through the bifurcated cam portion 82 extends entirely to the high point 125 of the cam, thereby insuring that all of the liquid is squeezed from the front of the blade and into the exhaust vent before the abutment seals the blade. The abutments are made readily detachable so as to permit their convenient replacement upon the occasion of wear manifesting itself on the leaf seal 119.

The embodiment of the invention described above contemplates the operation of the compressor by a one-quarter horse-power electric motor, and the capacity of the pressure tank at five gallons, although these values may be varied along conventional lines depending upon the work output required.

In order to procure full working advantage from the motor, the combined areas of the exhaust vents should be larger than that of the inlet ducts, and the diameter and placement of the alternate vents and inlets is such that they are engaged by the blades at proper time intervals in order to promote smooth operation.

Selection of materials for construction of the parts described is a matter of empyrical machine design. In the present embodiment, it is contemplated that the rotor casing and wheel is of cast steel, with the pressure plates and abutment leaves each composed of bronze. The various pipes and tanks may be of steel or galvanized metal, while the driven shaft and the various bolts are of steel.

It should be clearly understood that the invention is not to be limited to the construction described, but only by the scope of the appended claims.

What I claim is:

1. An expansible two-piece blade for a fluid pressure actuated rotor, one piece extending full width and having frontal and lateral recesses, and the other having portions slidable in each recess to prevent leakage.

2. In a system for fluid power transmission, the combination of a rotor, a casing therefor, fluid pressure supply means connected thereto for driving the rotor, a communicating exhaust in the casing, a radial recess in the rotor, an articulated blade reciprocable radially in the recess, and a continuous radial vent extending in the blade and communicating with the supply means and the recess as a sole inlet for the pressure fluid to the recess.

ERNEST L. THOMPSON.